United States Patent
Zhi et al.

(10) Patent No.: US 12,504,225 B2
(45) Date of Patent: Dec. 23, 2025

(54) HYDROGEN OR HELIUM THROTTLING LIQUEFACTION SYSTEM USING DIRECT CURRENT FLOW FROM THE COLD AND HOT ENDS OF THE REGENERATIVE CRYOCOOLERS

(71) Applicant: ZHEJIANG UNIVERSITY, Hangzhou (CN)

(72) Inventors: Xiaoqin Zhi, Hangzhou (CN); Limin Qiu, Hangzhou (CN); Tao Wei, Hangzhou (CN); Xin Chen, Hangzhou (CN); Kai Wang, Hangzhou (CN); Shiran Bao, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 18/023,715

(22) PCT Filed: Jul. 7, 2022

(86) PCT No.: PCT/CN2022/104351
§ 371 (c)(1),
(2) Date: Feb. 27, 2023

(87) PCT Pub. No.: WO2023/226167
PCT Pub. Date: Nov. 30, 2023

(65) Prior Publication Data
US 2024/0263871 A1 Aug. 8, 2024

(30) Foreign Application Priority Data
May 23, 2022 (CN) .......................... 202210566059.1

(51) Int. Cl.
*F25B 9/14* (2006.01)
*F25B 9/10* (2006.01)
(Continued)

(52) U.S. Cl.
CPC .................. *F25J 1/004* (2013.01); *F25B 9/10* (2013.01); *F25B 9/14* (2013.01); *F25B 9/145* (2013.01);
(Continued)

(58) Field of Classification Search
CPC .................................. F25B 9/14; F25B 9/145
(Continued)

(56) References Cited

U.S. PATENT DOCUMENTS

| | | | |
|---|---|---|---|
| 2006/0097146 A1* | 5/2006 | Strobel | .................. G01R 33/31 324/318 |
| 2012/0085121 A1 | 4/2012 | Longsworth | |
| 2013/0008190 A1* | 1/2013 | Longsworth | ............ F04B 37/08 62/55.5 |

FOREIGN PATENT DOCUMENTS

| | | |
|---|---|---|
| CN | 104792056 | 7/2015 |
| CN | 106642837 | 5/2017 |

(Continued)

OTHER PUBLICATIONS

English translation of CN 104792056 (Year: 2015).*
English translation of CN 113803905 (Year: 2021).*

*Primary Examiner* — John F Pettitt, III
(74) *Attorney, Agent, or Firm* — Jiwen Chen; Joywin IP Law PLLC

(57) ABSTRACT

The present invention discloses a hydrogen or helium throttling liquefaction system using direct current (DC) flow from the cold and hot ends of the regenerative cryocoolers, which belongs to the technical field of refrigeration and cryogenics. It includes a regenerative cryocooler module, a hot-end DC flow module, a cold-end DC flow module, a throttling liquefaction module, and a gas-phase circulation module. The modules are interconnected to form a closed loop for the flow of hydrogen or helium working fluid. DC flow is introduced from the cold and hot ends of the (Continued)

regenerative cryocooler through the DC flow pipelines and DC flow valves. The hot-end DC flow exchanges heat with the reflowing low-temperature working fluid and is cooled down. After that, it mixes with the cold-end DC flow and enters the throttling liquefaction module to generate liquid phase through throttling and liquefaction. After the liquid phase has output cooling capacity, it flows through the gas-phase circulation module and then enters the back-pressure chamber of the compressor to complete the cycle. Compared with the existing small-scale hydrogen and helium liquefaction technology using regenerative cryocoolers, the present invention has the advantages of simple structure, easy installation, high heat transfer efficiency and liquefaction efficiency of the system.

9 Claims, 2 Drawing Sheets

(51) Int. Cl.
*F25J 1/00* (2006.01)
*F25J 1/02* (2006.01)

(52) U.S. Cl.
CPC ............. *F25J 1/0007* (2013.01); *F25J 1/001* (2013.01); *F25J 1/0065* (2013.01); *F25J 1/0067* (2013.01); *F25J 1/0202* (2013.01); *F25J 1/0242* (2013.01); *F25J 1/0264* (2013.01); *F25J 1/0276* (2013.01); *F25B 2309/1408* (2013.01); *F25B 2309/1412* (2013.01); *F25B 2309/1422* (2013.01)

(58) Field of Classification Search
USPC .............................................................. 62/6
See application file for complete search history.

(56) References Cited

FOREIGN PATENT DOCUMENTS

| | | | | |
|---|---|---|---|---|
| CN | 112097422 | | 12/2020 | |
| CN | 113803905 | | 12/2021 | |
| CN | 114322349 | | 4/2022 | |
| CN | 114353366 | | 4/2022 | |
| CN | 114353432 | | 4/2022 | |
| JP | H04-52467 | A | 2/1992 | |
| JP | 2000035253 | A * | 2/2000 | ............. F25B 25/00 |
| JP | 2000074518 | A * | 3/2000 | ............. F25B 25/00 |
| JP | 2000220902 | A * | 8/2000 | ............. F25B 25/00 |
| JP | 3756711 | B2 * | 3/2006 | |

* cited by examiner

HYDROGEN OR HELIUM THROTTLING LIQUEFACTION SYSTEM USING DIRECT CURRENT FLOW FROM THE COLD AND HOT ENDS OF THE REGENERATIVE CRYOCOOLERS

This is a U.S. national stage application of PCT Application No. PCT/CN2022/104351 under 35 U.S.C. 371, filed Jul. 7, 2022 in Chinese, claiming priority of Chinese Application No. 202210566059.1, filed May 23, 2022, all of which are hereby incorporated by reference.

FIELD OF TECHNOLOGY

The present invention belongs to the technical field of refrigeration and cryogenics, especially relating to a hydrogen or helium throttling liquefaction system using direct current flow from the cold and hot ends of the regenerative cryocoolers.

BACKGROUND TECHNOLOGY

Regenerative cryocoolers such as pulse tube cryocoolers and GM cryocoolers are the main refrigeration technologies for small-scale hydrogen and helium liquefaction and recondensation systems around the world due to their advantages of simple structure, reliable operation, and low vibration.

Taking helium gas as an example, in 1989, H. Yoshimura et al. from Mitsubishi Group of Japan used $Gd_xEr_{1-x}Rh$ compound as the filling of the third-stage regenerator to develop a three-stage GM cryocooler with minimum no-load temperature of 3.3 K and cooling capacity of 20 mW at 4.2 K. Using this cryocooler, they realized helium liquefaction without using Joule-Thomson (JT) stages for the first time. In 1997, G. Thummes and Chao Wang from the University of Giessen in Germany improved a two-stage pulse tube cryocooler, and they firstly used the regenerator of the cryocooler to pre-cool helium. At present, the development of helium liquefiers using a single cryocooler is mainly attributed to the improvement of cryocoolers' performance and the discovery and utilization of excess cooling capacity from the regenerator. By utilizing the excess cooling capacity from the regenerator, the helium gas is gradually pre-cooled before reaching the condenser, greatly reducing the consumption of sensible heat on the cooling capacity at the saturation temperature. For helium and hydrogen, the ratios of sensible heat from room temperature to liquefaction temperature to latent heat of gas-liquid phase transition are more than 70 times. If only a single cryocooler is used to liquefy helium from room temperature at 1 bar, to completely absorb the sensible heat, the regenerator needs to absorb more than 70 times the heat absorbed by the cold end. Otherwise, the high-grade cooling capacity will be consumed to absorb sensible heat, resulting in a decrease in liquefaction efficiency, which puts forward higher performance requirements for cryocoolers. Therefore, the efficiency of helium liquefaction using a single cryocooler is still at a relatively low level. For example, a pulse tube cryocooler with a cooling capacity of 1 W at 4.2 K, its theoretical liquefaction rate is 33 L/day, while the actual BOG (boil-off gas) condensation rate is only 18 L/day, and that of the liquefaction from room temperature is even less, only 10-12 L/day, which is only 30%-60% of the ideal liquefaction rate. The energy consumption is as high as 11-19 kW·h/L. The low liquefaction rate of a single cryocooler has led to the need for multiple cryocoolers to meet the required liquefaction rate for hydrogen and helium in many occasions, resulting in high costs, high energy consumption, and complex system operation. Therefore, fully utilizing the existing cooling capacity of the cryocooler to further improve the liquefaction rate of hydrogen and helium with a single cryocooler is the main direction of development of small-scale hydrogen and helium liquefiers. The key to increasing liquefaction rate is to make full use of the excess cooling capacity from the regenerator to reduce the superheat of the gas to be liquefied and at the same time strengthen the film condensation heat transfer at the condenser.

The existing modes of pre-cooling the gas to be liquefied through the coil-type heat exchangers, natural convection heat transfer or annular fin heat exchangers on the regenerator are all non-contact heat exchange and have large heat transfer thermal resistances. In addition, the imperfection of the film condensation theory of saturated helium and hydrogen at the cold end of the cryocooler leads to deviations in the design of hydrogen and helium condensers. This makes the use of regenerative cryocoolers to liquefy hydrogen and helium less efficient, and higher cost. The fundamental reason is the large heat transfer losses in the indirect precooling and indirect condensation.

SUMMARY OF THE INVENTION

The present invention provides a hydrogen or helium throttling liquefaction system using direct current flow from the cold and hot ends of the regenerative cryocoolers which can overcome the technical defects in the pre-cooling and condensation processes of traditional small-scale helium liquefiers, and also take advantage of the high phase-transition refrigeration efficiency of the J-T cycle at deep low temperatures.

A hydrogen or helium throttling liquefaction system using direct current flow from the cold and hot ends of the regenerative cryocoolers comprises a regenerative cryocooler module, a hot-end DC flow module, a cold-end DC flow module, a throttling liquefaction module, and a gas-phase circulation module. The modules are interconnected to form a closed loop for the flow of hydrogen or helium working fluid.

The throttling liquefaction module comprises, connected in sequence through low-temperature pipeline: a buffer chamber, the high-pressure channel of a recuperator, a throttle valve, and a liquid reservoir. The gas-phase circulation module comprises, connected in sequence through the refluxed pipeline: the low-pressure channel of the recuperator, the low-pressure channel of the heat exchange component, a control valve, and a small compression device.

The transfer tube of the compressor in the regenerative cryocooler module has a bypass, which is connected to the hot-end DC flow module. The lower end of the cold-end heat exchanger of the regenerator in the regenerative cryocooler module has an opening, which is connected to the cold-end DC flow module.

The hot-end DC flow module leads out the high-temperature and high-pressure working fluid in the transfer tube, which is then cooled down by exchanging heat with the working fluid in the refluxed pipeline inside the heat transfer component, and finally introduced into the buffer chamber. The cold-end DC flow module leads out the low-temperature and high-pressure working fluid from the cold-end heat exchanger and introduces it into the buffer chamber.

The high-pressure and low-temperature working fluid mixed in the buffer chamber is first passed through the recuperator for heat exchange, then is throttled and liquefied through the throttle valve before entering the liquid reservoir. The gaseous working fluid in the liquid reservoir is separated and recycled through the refluxed pipeline, after passing through the recuperator, the heat transfer component, the control valve, and the small compression device, its cooling capacity is recovered and it is recompressed. Finally, it returned to the low-pressure side of the compressor in the regenerative cryocooler module to complete the cycle.

The present invention leads out low-temperature and high-pressure hydrogen or helium working fluid from the regenerative cryocooler module through DC flow pipelines and control valves, and a small DC flow will generate at the cold end of the regenerative cryocooler. The liquefaction of hydrogen or helium is realized by directly throttling through the throttling liquefaction module to produce cryogenic liquid. A part of the working fluid is directly lead out from the regenerative cryocooler module for liquefaction, which has the characteristics of internal precooling and internal liquefaction. This eliminates the indirect heat transfer resistance between the gas to be liquefied and the cryocooler in the traditional liquefaction mode, and finally improves the liquefaction performance of the system.

Furthermore, the regenerative cryocooler module comprises, connected in sequence, a compressor, a transfer tube, a hot-end heat exchanger of the regenerator, a regenerator, a cold-end heat exchanger of the regenerator, a transfer tube between regenerator and expansion device, a cold-end heat exchanger of the expansion device, an expansion device and a hot-end heat exchanger of the expansion device.

Furthermore, the hot-end DC flow module comprises, a hot-end DC flow pipeline and a hot-end DC flow valve. The hot-end DC flow pipeline is installed on the bypass of the transfer tube by welding.

Furthermore, the cold-end DC flow module comprises, a cold-end DC flow pipeline and a cold-end DC flow valve. The cold-end DC flow pipeline is installed at the lower opening of the heat exchanger by welding.

Optionally, the structural form of the regenerative cryocooler module is coaxial, U-shaped, or linear.

Optionally, the regenerative cryocooler module is a GM cryocooler, a GM pulse tube cryocooler, a Stirling cryocooler, a Stirling-type pulse tube cryocooler or a VM cryocooler.

Optionally, the regenerative cryocooler module is single-stage, two-stage or multi-stage; wherein, the two-stage or multi-stage coupling structure is a thermal-coupled structure or a gas-coupled structure.

Optionally, the compressor in the regenerative cryocooler module is a linear compressor or a GM compressor with valves, and the corresponding low-pressure chamber sides of the two are the back-pressure chamber of the linear compressor and the low-pressure tank of the GM compressor.

Compared with existing technologies, the present invention has the following advantages:

The structure of the present invention is simple and reliable, and the process of leading DC flow from the cold end and the hot end of the regenerative cryocooler and introducing it from the back-pressure chamber of the compressor has no special structural requirements for other parts of the cryocooler. Using the helium working medium inside the cryocooler as the source of liquefied helium replaces the mode of heat exchange between the helium to be liquefied at room temperature and the cylinder wall of the cryocooler, it avoids the defect of low heat transfer efficiency in pre-cooling. The liquefaction adopts the throttling, which eliminates helium film condensation and has higher liquefaction efficiency compared with indirectly using the cooling capacity of the cryocooler. Combining these two advantages, the present invention improves the liquefaction performance of the system. The device is also applicable to the hydrogen liquefaction, and can realize the improvement of the hydrogen liquefaction rate.

In figures: 1—compressor; 2—transfer tube; 3—hot-end heat exchanger of the regenerator; 4—regenerator; 5—cold-end heat exchanger of the regenerator; 6—transfer tube between regenerator and expansion device; 7—cold-end heat exchanger of the expansion device; 8—expansion device; 9—hot-end heat exchanger of the expansion device; 10—hot-end DC flow pipeline; 11—hot-end DC flow valve; 12—cold-end DC flow pipeline; 13—cold-end DC flow valve; 14—buffer chamber; 15—recuperator; 16—throttle valve; 17—liquid reservoir; 18—refluxed pipeline; 19—heat transfer component; 20—control valve; 21—small compression device.

DETAILED DESCRIPTION OF THE EMBODIMENTS

The present invention will be further described in detail below with reference to the accompanying figures and embodiments. It should be noted that the following embodiments are intended to facilitate the understanding of the present invention, but do not limit it in any way.

Figure 1:
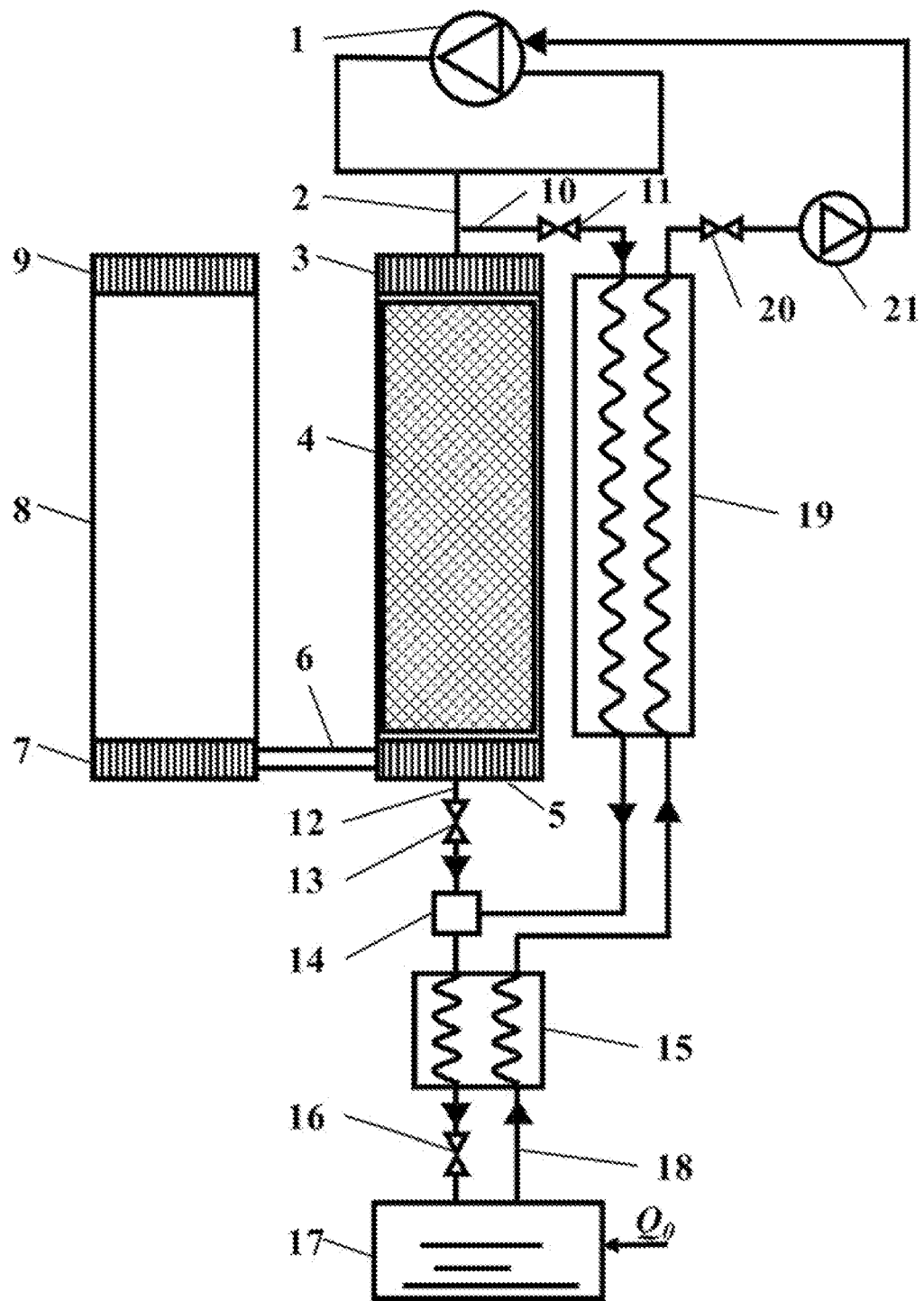
FIG. 1 is the schematic diagram of the overall structure of the present invention.

As shown in FIG. 1, a hydrogen or helium throttling liquefaction system using direct current flow from the cold and hot ends of the regenerative cryocoolers comprises a regenerative cryocooler module, a hot-end DC flow module, a cold-end DC flow module, a throttling liquefaction module, and a gas-phase circulation module.

The regenerative cryocooler module comprises, connected in sequence, a compressor (1), a transfer tube (2), a hot-end heat exchanger of the regenerator (3), a regenerator (4), a cold-end heat exchanger of the regenerator (5), a transfer tube between regenerator and expansion device (6), a cold-end heat exchanger of the expansion device (7), an expansion device (8) and a hot-end heat exchanger of the expansion device (9).

The throttling liquefaction module comprises, connected in sequence through a low-temperature pipeline: a buffer chamber (14), the high-pressure channel of the recuperator (15), a throttle valve (16), and a liquid reservoir (17). The gas-phase circulation module comprises, connected in sequence through the refluxed pipeline (18): the low-pressure channel of the recuperator (15), the low-pressure channel of the heat exchange component (19), a control valve (20), and a small compression device (21).

The hot-end DC flow module comprises, a hot-end DC flow pipeline (10) and a hot-end DC flow valve (11). The hot-end DC flow pipeline (10) is installed on the bypass of the transfer tube (2) by welding. The cold-end DC flow module comprises, a cold-end DC flow pipeline (12) and a cold-end DC flow valve (13). The cold-end DC flow pipeline (12) is installed at the lower opening of the heat exchanger (5) by welding.

The hot-end DC flow module leads out the high-temperature and high-pressure working fluid in the transfer tube (2), which is then cooled down by exchanging heat with the working fluid in the refluxed pipeline (18) inside the heat transfer component (19), and finally introduced into the buffer chamber (14). The cold-end DC flow module leads out the low-temperature and high-pressure working fluid from the cold-end heat exchanger (5) and introduces it into the buffer chamber (14).

The high-pressure and low-temperature working fluid mixed in the buffer chamber (14) is first passed through the recuperator (15) for heat exchange, then is throttled and liquefied through the throttle valve (16) before entering the liquid reservoir (17). The gaseous working fluid in the liquid reservoir (17) is separated and recycled through the refluxed pipeline (18), after passing through the recuperator (15), the heat transfer component (19), the control valve (20), and the small compression device (21), its cooling capacity is recovered and it is recompressed. Finally, it returned to the low-pressure side of the compressor (1) in the regenerative cryocooler module to complete the cycle.

When the system is operating, the working fluid flows alternately in the regenerative cryocooler module to perform a regenerative refrigeration cycle. Compared with the heat exchange outside the cylinder, the working fluid of the cryocooler directly participates in the refrigeration, with more sufficient heat exchange of pre-cooling and high temperature controllability.

The throttling valve (16) is connected to the end of the high-pressure pipeline of the recuperator (15), and the working fluid is throttled, expanded, cooled, and liquefied. The liquefied working fluid can absorb the heat load of the object to be cooled and evaporate to utilize the cooling capacity, and it can also be produced as a low-temperature liquid product and the cryocooler needs supplemental helium at the compressor.

The gas phase in the liquid reservoir (17) is separated through the refluxed pipeline, and flows through the heat exchange component of the hot-end DC flow pipeline and the refluxed pipeline, the cooling capacity at each temperature of the refluxed gas phase is fully recovered to cool the hot-end DC flow and reduce its temperature.

Taking helium as an example, the low-temperature and high-pressure working fluid is drawn from the cold-end heat exchanger of the regenerator through the cold-end DC flow module and introduced into the buffer chamber of the throttling liquefaction module. The high-temperature and high-pressure working fluid is drawn from the transfer tube through the hot-end DC flow module and introduced into the buffer chamber of the throttling liquefaction module after being cooled by heat exchange with the refluxed pipeline. The high-pressure and low-temperature working fluid mixed by the two DC flow is throttled and liquefied through the throttle valve. The liquid phase absorbs the heat load to refrigerate and evaporate. The gas phase is preheated through the gas-phase circulation module to recover cooling and cool down the working fluid in the hot-end DC flow pipeline. Then the refluxed gas phase is compressed and pressurized, and finally returns to the low-pressure side of the compressor of the cryocooler to complete the cycle.

Compared with traditional small-scale helium liquefiers using cryocoolers whose liquefaction is limited by the heat exchange efficiency of the pre-cooling by excess cooling capacity from regenerator and the cryocooler's cooling capacity at saturation temperature, the liquefaction system designed by the present invention has higher precooling efficiency, and the liquefaction rate is not limited by the cooling capacity of the cryocooler.

The pre-cooling of the traditional liquefiers uses a coil heat exchanger wound on the cylinder of the cryocooler or uses natural convection of helium to make the gas to be liquefied pass through the cylinder to exchange heat with the internal working fluid. The heat exchange area and the excess cooling capacity that can be extracted by the regenerator are limited, and too much cooling capacity extracted from the regenerator will affect the performance of the cryocooler. In particular, for GM cryocoolers, there is a gas gap between the regenerator and the cylinder, which affects the heat transfer efficiency. Existing experimental and numerical studies have shown that the COP of the regenerative cryocooler can be improved by introducing DC flow, while the mass flow in contact with the outer wall of the cryocooler is thermodynamically the same as the DC flow inside the cryocooler. Therefore, in the present invention, the mass flow in the traditional small-scale helium liquefier in contact with the outer wall of the cryocooler is replaced by the DC flow inside the cryocooler. By leading the working fluid from the cold-end heat exchanger of the regenerator to form a DC flow inside the cryocooler, and at the same time the cooling capacity of the low-temperature and low-pressure working fluid that needs to be refluxed is recovered to pre-cool the hot-end DC flow. This makes the refrigeration temperature of the present invention controllable, and also eliminates the problem of low heat exchange efficiency of the pre-cooling in traditional liquefiers.

The DC flow rate derived from the cold end and the hot end of the cryocooler can be calculated according to the throttling liquefaction rate of helium or the cooling capacity demand, and the pre-cooling heat exchange of the hot-end DC flow, and it can be controlled by each DC flow valve.

Figure 2:
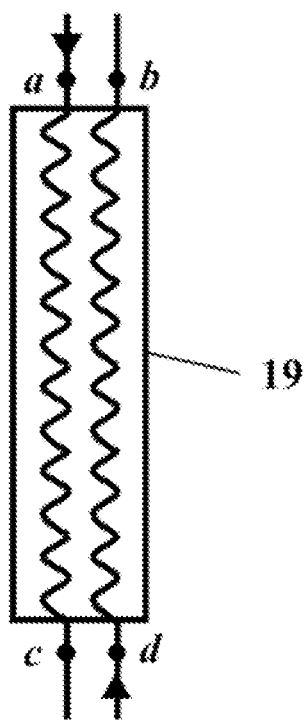
FIG. 2 is the schematic diagram of state points in the heat exchange component in the embodiments of the present invention.
Figure 3:
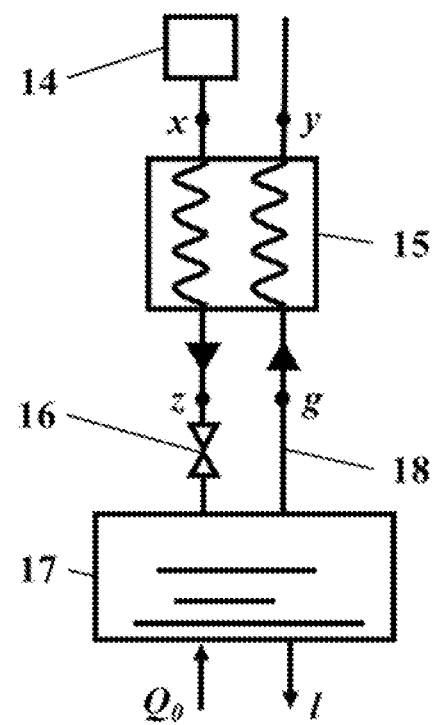
FIG. 3 is the schematic diagram of state points in the throttling liquefaction module in the embodiments of the present invention.

FIG. 2 shows some status points in the heat exchange components of the hot-end DC flow pipeline and the refluxed pipeline; FIG. 3 shows the status points in the throttling liquefaction module.

The total mass flow rate of DC flow introduced from cryocooler is the sum of the flow rates of cold-end DC flow and hot-end DC flow:

$$\dot{m} = \dot{m}_H + \dot{m}_C$$

Where, $\dot{m}$ is the total mass flow rate of DC flow introduced from cryocooler, $\dot{m}_H$ is the mass flow rate of hot-end DC flow introduced from transfer tube, $\dot{m}_C$ is the cold-end DC flow introduced from the cold end of regenerator.

Apply the first law of thermodynamics to the heat exchanger part of hot-end DC flow pipeline and refluxed pipeline:

$$\dot{m} h_d + \dot{m}_H h_a = \dot{m} h_b + \dot{m}_H h_c$$

Where, h is specific enthalpy of each point.
The ratio of hot-end DC flow rate to the total DC flow rate is:

$$i = \frac{\dot{m}_H}{\dot{m}} = \frac{h_b - h_d}{h_a - h_c}$$

Where, $h_a-h_c$ is enthalpy difference of high-pressure working fluid passing through heat exchanger; $h_p-h_a$ is enthalpy difference of low-pressure working fluid passing through heat exchanger. Assuming that the temperature of each point at the inlet and outlet of the recuperator is equal, that is $T_a=T_b$, $T_c=T_d$. The enthalpy difference at the same temperature difference is that the high-pressure side is higher than the low-pressure side, which means $h_b-h_d/h_a-h_c<1$. The ratio of cold-end DC flow rate to the total DC flow rate is 1−i.

In the case of liquefaction, the relationship between the total DC flow drawn from the regenerative cryocooler and the final liquefaction rate is as follows (apply the first law of thermodynamics to the throttling liquefaction module except the buffer chamber):

$$\dot{m}h_x = (\dot{m}-\dot{m}_l)h_y + \dot{m}_l h_l$$

Where, $\dot{m}_l$ is the mass flow rate of liquid phase, $h_l$ is the specific enthalpy of liquid, $h_x$ is the specific enthalpy of cold-end DC flow, $h_y$ is the specific enthalpy of refluxed gas phase.

The yield of liquid or liquefaction rate is defined as $\gamma=\dot{m}_l/\dot{m}$ and reorganize the formula above:

$$y = \frac{\dot{m}_l}{\dot{m}} = \frac{h_y-h_x}{h_y-h_l}$$

In the case of refrigeration, the relationship between DC flow rate and cooling capacity:

$$\dot{m}h_y = \dot{m}h_x + Q_0$$

Where, $Q_0$ is the cooling capacity which can be determined by the state of each point:

$$Q_0 = \dot{m}(h_y-h_x)$$

It can be seen from the above formula that the liquefaction rate (equivalent cooling capacity) of the liquefaction system proposed by this is no longer limited by the cooling capacity of the regenerative cryocooler at the saturation temperature of helium.

Taking a cryocooler with cooling capacity of 1 W at 4.2 K as an example, assuming that a DC flow of 5 K and 2 Mpa drawn from the refrigerator is throttled to 1 bar, the calculated liquefaction rate γ is about 0.5758. In order to obtain the theoretical maximum liquefaction rate per unit cooling capacity of 33 L/day, the total DC flow rate $\dot{m}=\dot{m}_l/\gamma$ that needs to be drawn from the cryocooler is about 0.085 g/s, which is less than 1% of the actual flow amplitude inside the cryocooler. According to the existing literatures, its impact on the performance of the cryocooler can be ignored, and most of the DC flow is the hot-end DC flow drawn from the outlet of the compressor. It is only necessary to increase the mass flow rate at the outlet of the compressor which will not affect the performance of the cryocooler. The liquefaction rate after throttling can reach 33 L/day, and a huge increase in liquefaction rate that can be achieved by adjusting the working conditions according to demand. This is far greater than the maximum unit cold liquefaction rate (10-12 L/day) that can be achieved by existing traditional small-scale helium liquefiers. Therefore, the present invention can greatly improve the liquefaction rate of the helium liquefaction system.

The embodiments described above have described the technical solutions and beneficial effects of the present invention in detail. It should be understood that the above descriptions are only specific embodiments of the present invention and are not intended to limit the present invention. Any modification, supplement and equivalent replacement made within the principal scope of the present invention shall be included in the protection scope of the present invention.

The invention claimed is:

1. A hydrogen or helium throttling liquefaction system comprising: a regenerative cryocooler module, a hot-end DC flow module, a cold-end DC flow module, a throttling liquefaction module, and a gas-phase circulation module; wherein the modules are operatively interconnected to form a closed loop for flow of hydrogen or helium working fluid;

wherein the throttling liquefaction module comprises: a buffer chamber (14), a first channel of a recuperator (15), a throttle valve (16), and a liquid reservoir (17) all of which are connected in sequence; the gas-phase circulation module comprises, connected in sequence through a refluxed pipeline (18), a second channel of the recuperator (15), a first channel of a heat exchange component (19), a control valve (20), and a compression device (21);

wherein a transfer tube (2) of a compressor in the regenerative cryocooler module has a channel connected to the hot-end DC flow module, a lower end of a cold-end heat exchanger of a regenerator in the regenerative cryocooler module has an opening connected to the cold-end DC flow module;

wherein the hot-end DC flow module leads out the hydrogen or helium working fluid in the transfer tube (2), the hydrogen or helium working fluid is then cooled down by exchanging heat with a gaseous working fluid in the refluxed pipeline (18) inside the heat exchange component (19), and introduced into the buffer chamber (14), the cold-end DC flow module leads out the hydrogen or helium working fluid from the cold-end heat exchanger (5) and introduces the hydrogen or helium working fluid into the buffer chamber (14);

wherein the hydrogen or helium working fluid mixed in the buffer chamber (14) is first passed through the recuperator (15) for heat exchange, then is throttled and liquefied through the throttle valve (16) before entering the liquid reservoir (17); the gaseous working fluid in the liquid reservoir (17) is separated and recycled through the refluxed pipeline (18), after passing through the recuperator (15), the heat exchange component (19), the control valve (20), and the compression device (21), the gaseous working fluid's cooling capacity is recovered and the gaseous working fluid is recompressed; the gaseous working fluid returned to the compressor (1) in the regenerative cryocooler module to complete a cycle;

wherein the hot-end DC flow module comprises, a hot-end DC flow pipeline (10) and a hot-end DC flow valve (11); a first end of the hot-end DC flow pipeline (10) is installed on the channel of the transfer tube (2) by welding; a second end of the hot-end DC flow pipeline (10) is connected with the hot-end DC flow valve (11);

the hot-end DC flow valve (11) is connected with a second channel of the heat exchange component (19), wherein heat exchange occurs between the first channel and the second channel of the heat exchange component (19);

wherein the cold-end DC flow module comprises a cold-end DC flow pipeline (12) and a cold-end DC flow valve (13); the cold-end DC flow pipeline (12) is installed at the opening of the cold-end heat exchanger (5) by welding.

2. The hydrogen or helium throttling liquefaction system according to claim 1, characterized in that the regenerative cryocooler module comprises, connected in sequence, the compressor (1), the transfer tube (2) of the compressor (1), a hot-end heat exchanger (3) of the regenerator (4), the regenerator (4), the cold-end heat exchanger (5) of the regenerator (4), a transfer tube (6) between the regenerator (4) and an expansion device (8), a cold-end heat exchanger (7) of the expansion device (8), the expansion device (8), and a hot-end heat exchanger (9) of the expansion device (8).

3. The hydrogen or helium throttling liquefaction system according to claim 1, characterized in that a structural form of the regenerative cryocooler module is coaxial, U-shaped, or linear.

4. The hydrogen or helium throttling liquefaction system according to claim 1, characterized in that the regenerative cryocooler module is single-stage.

5. The hydrogen or helium throttling liquefaction system according to claim 1, characterized in that the compressor in the regenerative cryocooler module is a linear compressor or a GM compressor, and corresponding chamber of the linear compressor and the GM compressor are a back-pressure chamber of the linear compressor and the GM compressor, respectively.

6. The hydrogen or helium throttling liquefaction system according to claim 3, characterized in that: a structural form of the regenerative cryocooler module is U-shaped.

7. The hydrogen or helium throttling liquefaction system according to claim 1, characterized in that:
a structural form of the regenerative cryocooler module is U-shaped;
and
the compressor in the regenerative cryocooler module is a GM compressor.

8. A hydrogen or helium throttling liquefaction system consisting essentially of: a regenerative cryocooler module, a hot-end DC flow module, a cold-end DC flow module, a throttling liquefaction module, and a gas-phase circulation module; wherein the modules are operatively interconnected to form a closed loop for flow of hydrogen or helium working fluid;
wherein the throttling liquefaction module consists essentially of: a buffer chamber (14), a first channel of a recuperator (15), a throttle valve (16), and a liquid reservoir (17) all of which are connected in sequence; the gas-phase circulation module comprises, connected in sequence through a refluxed pipeline (18), a second channel of the recuperator (15), a first channel of a heat exchange component (19), a control valve (20), and a compression device (21);

wherein a transfer tube (2) of a compressor in the regenerative cryocooler module has a channel connected to the hot-end DC flow module, a lower end of a cold-end heat exchanger of a regenerator in the regenerative cryocooler module has an opening connected to the cold-end DC flow module;

wherein the hot-end DC flow module leads out the hydrogen or helium working fluid in the transfer tube (2), the hydrogen or helium working fluid is then cooled down by exchanging heat with a gaseous working fluid in the refluxed pipeline (18) inside the heat exchange component (19), and introduced into the buffer chamber (14), the cold-end DC flow module leads out the hydrogen or helium working fluid from the cold-end heat exchanger (5) and introduces the hydrogen or helium working fluid into the buffer chamber (14);

wherein the hydrogen or helium working fluid mixed in the buffer chamber (14) is first passed through the recuperator (15) for heat exchange, then is throttled and liquefied through the throttle valve (16) before entering the liquid reservoir (17); the gaseous working fluid in the liquid reservoir (17) is separated and recycled through the refluxed pipeline (18), after passing through the recuperator (15), the heat exchange component (19), the control valve (20), and the compression device (21), the gaseous working fluid's cooling capacity is recovered and the gaseous working fluid is recompressed; the gaseous working fluid returned to the compressor (1) in the regenerative cryocooler module to complete a cycle;

wherein the hot-end DC flow module consists essentially of, a hot-end DC flow pipeline (10) and a hot-end DC flow valve (11); a first end of the hot-end DC flow pipeline (10) is installed on the channel of the transfer tube (2) by welding; a second end of the hot-end DC flow pipeline (10) is connected with the hot-end DC flow valve (11); the hot-end DC flow valve (11) is connected with a second channel of the heat exchange component (19), wherein heat exchange occurs between the first channel and the second channel of the heat exchange component (19);

wherein the regenerative cryocooler module consists essentially of, connected in sequence, the compressor (1), the transfer tube (2) of the compressor (1), a hot-end heat exchanger (3) of the regenerator (4), the regenerator (4), the cold-end heat exchanger (5) of the regenerator (4), a transfer tube (6) between the regenerator (4) and an expansion device (8), a cold-end heat exchanger (7) of the expansion device (8), the expansion device (8), and a hot-end heat exchanger (9) of the expansion device (8).

9. The hydrogen or helium throttling liquefaction system according to claim 8, characterized in that the compressor in the regenerative cryocooler module is a linear compressor or a GM compressor, and corresponding chamber of the linear compressor and the GM compressor are a back-pressure chamber of the linear compressor and the GM compressor, respectively; and
wherein a structural form of the regenerative cryocooler module is U-shaped.

* * * * *